UNITED STATES PATENT OFFICE.

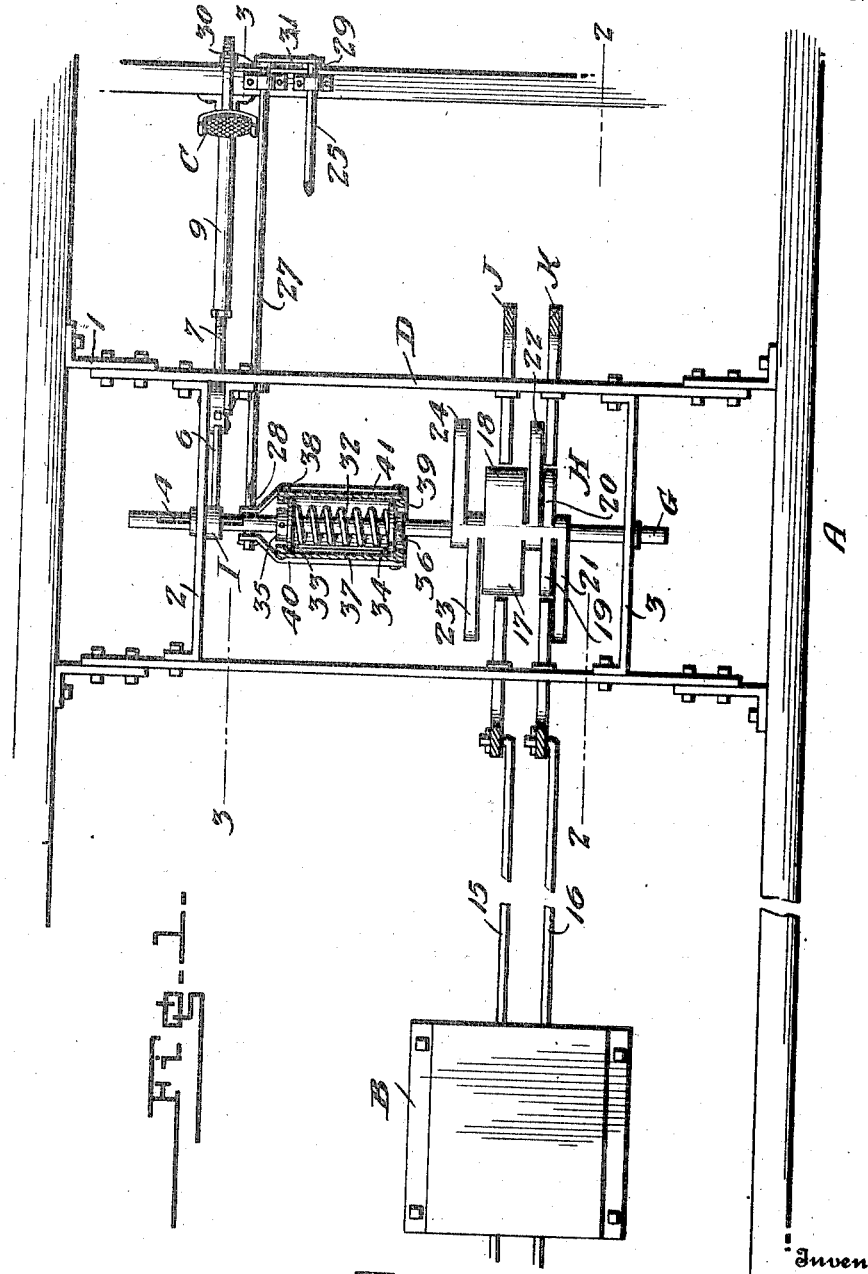

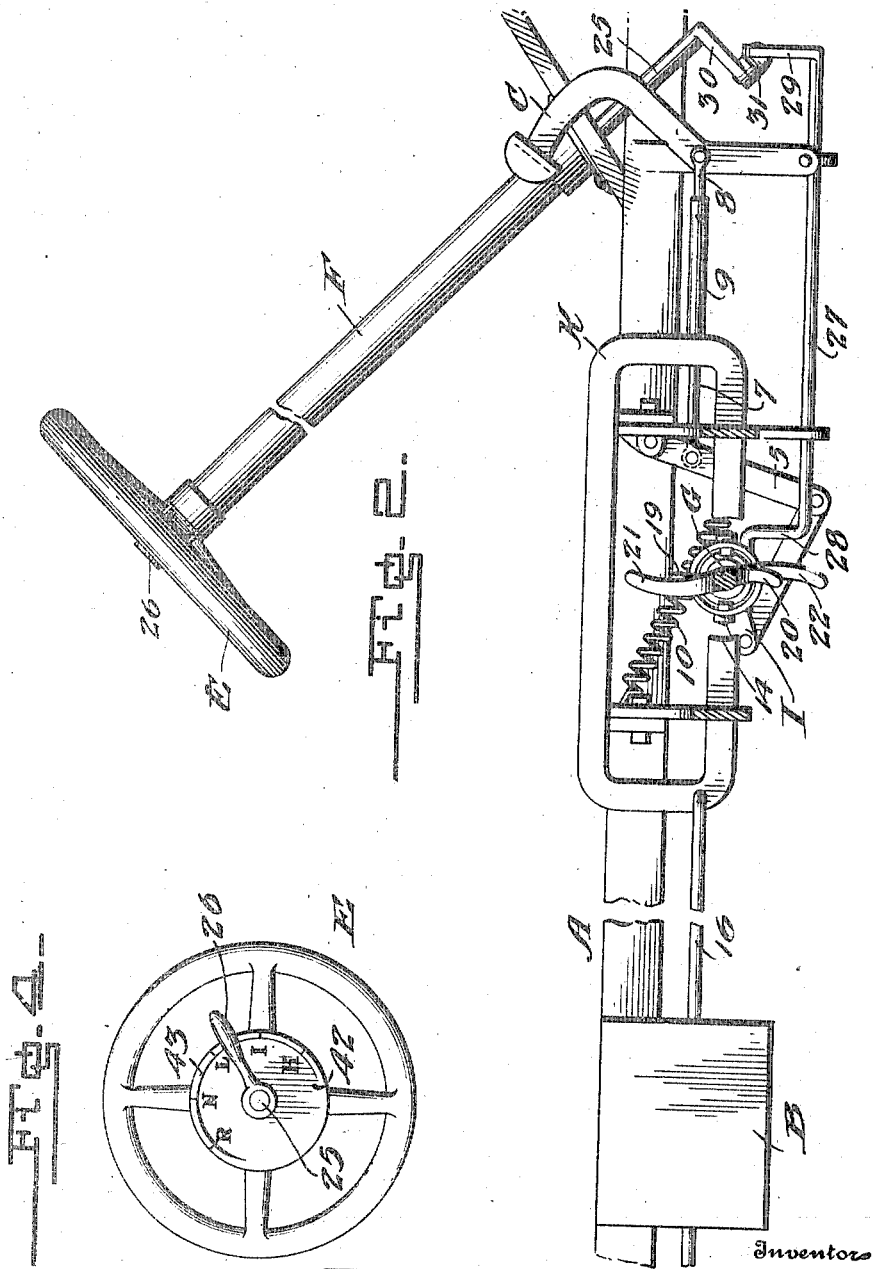

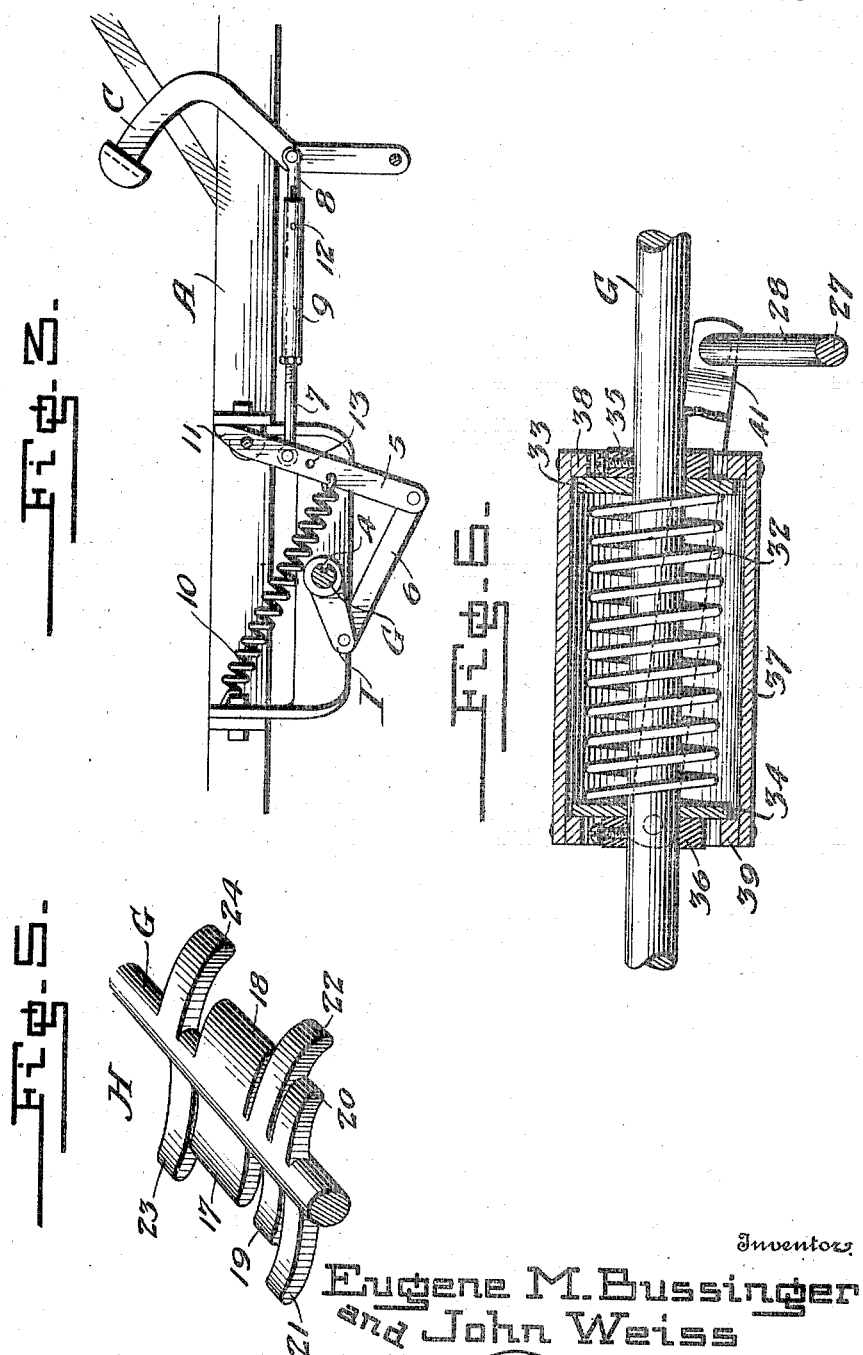

EUGENE M. BUSSINGER AND JOHN WEISS, OF CHICAGO, ILLINOIS.

GEAR-SHIFTING DEVICE.

1,316,828. Specification of Letters Patent. Patented Sept. 23, 1919.

Application filed March 11, 1918. Serial No. 221,833.

*To all whom it may concern:*

Be it known that we, EUGENE M. BUSSINGER and JOHN WEISS, citizens of the United States, and residents of Chicago, in the county of Cook and State of Illinois, have invented new and useful Improvements in Gear-Shifting Devices, of which the following is a specification.

Our present invention relates to a gear shifting device, and more particularly to shifting mechanism adapted for use upon automobiles and in other like connections where a changeable transmission and a clutch are employed.

The principal object of our invention is to provide a shifting device for the purposes above set forth which is to be constructed and mounted in such a manner that the gear shifting lever as now usually employed can be entirely dispensed with and the setting to change the gears in the transmission will be accomplished through manual manipulation of a small lever or handle located to be conveniently accessible to an operator handling the steering wheel of the vehicle.

Another object is to arrange the parts in such a way that even an inexperienced operator can readily determine when proper setting of the parts has been accomplished for the desired speed of transmission, and with which structure the shifting of the gears is accomplished by release of the clutch.

A still further object is to provide a shifter which can be set for the next desired change while the operation of the vehicle is continued, and with which arrangement of the parts the foot pressure upon the clutch pedal to release the clutch will accomplish shifting of the parts which is given, the parts being at the same time of such a construction that when the clutch is released it is not necessary to again throw the same into the driving connection in order that the gears may be again shifted.

Further objects of our invention will appear in the following detailed description, taken in connection with the accompanying drawings, forming a part of this specification and in which drawings:

Figure 1 is a view in plan showing the structure of our invention as it will be embodied with an automobile or like vehicle.

Fig. 2 is a sectional view taken substantially on the line 2—2 of Fig. 1.

Fig. 3 is a detail sectional view on the line 3—3 of Fig. 1.

Fig. 4 is a view in elevation of a steering wheel showing the fitting of the setting and control handle or lever.

Fig. 5 is a detail perspective view to better disclose the construction and the shape of the cam portion.

Fig. 6 is a fragmentary sectional view showing the lost motion connection by which the parts can be set when the clutch is released.

In the drawings, where similar characters refer to similar parts throughout the views, A generally designates the frame structure of an automobile or motor vehicle which has the transmission and change speed gearing inclosed within the casing B, the clutch pedal C being mounted at a convenient point adjacent the forward end of the frame, and being connected with the clutch in any approved manner. A supporting frame D is mounted on the main frame A between the transmission casing and the clutch pedal, and it is on this frame D that the main parts of our invention are carried and supported. A steering wheel E is mounted on a steering post F, and these parts as well as the remaining portions of the vehicle are of substantially standard form and construction.

As has been stated, the frame portion D is carried by the main frame A, and the mounting of the same is in the present instance shown as being accomplished by the use of the bracket members 1 to which the frame structure D is connected by the use of bolts or in any other suitable manner. As shown, the frame structure D is made up of side bars and the cross bars 2 and 3, and that the structure may be adaptable for use upon vehicle frames of different width, it is perhaps desirable that slotted openings be provided for reception of the bolts by which this frame structure is mounted in conjunction with the bracket members 1, as then adjustment of the parts can be made so that irrespective of the width of the main frame the frame portion D can be mounted to be supported at the proper position.

The cross members 2 and 3 of the frame structure D have bearings provided substantially centrally therein, and a shaft G is mounted revolubly and slidably within these bearings. A cam H is carried by the shaft G, and a shifting arm I is loosely mounted on the shaft, to have sliding movement, a key working in the keyway or groove 4 however acting to hold this shifting arm I against turning movement upon the shaft.

As the cam H is brought to an active position and the shaft G is shifted through the arm I from a connection with the clutch pedal C, parts are provided substantially as shown in Fig. 3. As here illustrated, a motion increasing lever 5 is mounted pivotally on the frame structure D, and the free end thereof is connected with the arm I by a link 6. A draw bar which includes the screw-threaded rod portion 7 is associated with the motion increasing lever 5, the rod portion 8 having a slotted opening adjacent the end thereof, and a sleeve 9, establishes a connection from the clutch pedal C to the motion increasing lever 5, and as the clutch pedal is pushed down, the lever 5 will be swung around its pivotal mounting to, though the link 6, exert swinging force upon the arm I, and in consequence the shaft G will be turned to bring the cam portion H to substantially the position shown in Figs. 1 and 5. A spring 10 is connected with the motion increasing lever 5 and with the frame structure so that it normally resiliently exerts force upon this lever to return the clutch pedal to the raised position and to at the same time swing the arm I through certain paths of movement that the shaft G is turned to dispose the cam portion H with the extensions thereof in upright relation as shown in Fig. 2. The motion increasing lever 5 has an extension 11 which is shaped to come to bearing engagement against the frame structure when the desired movement has been given to the lever 5. and thus the position of the parts as shown in Figs. 2 and 3 may be said to be the normal position. That adjustment may be made of the connection between the clutch pedal C and the lever 5, the sleeve 9 is internally screw-threaded at one end as to be turned upon the screw-threaded rod portion 7, while the rod portion 8 is received in a sliding fit within the remaining end of the same, a pin 12 being passed through the sleeve and through the slotted opening of the rod portion 8 to give a lost motion connection at this point. To allow for further adjustment, the lever 5 might be provided with a plurality of openings as shown at 13 for connection of the rod portion 7.

Substantially rectangularly shaped gear shifting members J and K, which are split or provided with the openings as indicated at 14, are mounted with the ends thereof adjacent the openings received through slide bearings in the frame structure D, and are so disposed that the shaft G and the cam member H are disposed within the openings 14. These gear shifting members J and K have gear shifting rods 15 and 16 connected therewith and then connected to accomplish shifting of the transmission gears from neutral to reverse, and also into low, intermediate, and high positions, and it will thus be appreciated that as the members J and K are shifted to exert pulling or pushing force upon the rods 15 and 16, the transmission gearing will be correspondingly shifted and will be set in desired position. The neutral setting will be accomplished when the shifting members J and K are disposed in such relation that the shaft G is centered within the openings 14, and therefore in the cam portion H, we embody cam extensions 17 and 18 which are of equal length in their projection from the shaft G and which act to center the member J, while the extensions 19 and 20 are provided to give a neutral setting to the shifting member K. The connection to the shiftable gears of the transmission is so accomplished that the member K is moved to swing the gearing to a reverse setting and to a setting for low or first speed, and to accomplish movement of the member K, a cam extension 21 is provided on one side of the shaft G and is so shaped that as the shaft is turned with this extension 21 lined up with the member K, it will exert bearing force upon this member to shift the same rearwardly and to thus accomplish pushing force upon the rod 16 and in consequence the transmission gearing will be set to accomplish a reverse drive. A cam extension 22 is provided inside of the cam extension 20, and when this cam extension acts upon the member K, the transmission gearing will be set for first or low speed. The cam extensions 23 and 24 are provided on opposite sides of the shaft G and at such positions that they may be brought into active relation with respect to the shifting member J, and these cam portions will act to set the transmission for intermediate and high speed or direct drive.

As has been stated, and is clearly shown by the drawings, the various cam extensions are located at different positions along the lengths of the shaft G, for the same is mounted between the shifting members J and K, and this shaft G is mounted to be capable of sliding as well as revoluble movement, so that the various cam extensions can be brought to the proper positions to act upon the shifting members J and K. Proper turning movement is imparted to shaft through the shifting arm I and the connection to the clutch pedal C, and that the entire control may be conveniently located for the operator, it is desirable that means be provided where it will be readily accessible from the steering wheel to accomplish shifting of the shaft G longitudinally through the bearings of the clutch bars 2 and 3, and also it is essential that provision be made for shifting of the shaft or to set the same to be shifted even while the shaft is turned to bring the cam portion H to the position shown in Fig. 1 where endwise movement of the shaft is not permitted.

An operating rod 25 is revolubly mounted in suitable bearings provided upon the frame and is extended to have its upper end projecting through the steering post and above the steering wheel E, at which point an operating lever or handle 26 is secured. An operating shaft 27 is mounted in suitable bearings provided upon the frame and is extended to have one end thereof terminate in a crank 28 adjacent the shaft G. The operating rod 25 has a crank arm 29 thereon and a crank arm 30 is provided on the operating shaft 27, a connection being established between these crank arms 29 and 30 through a link 31. A coil spring 32 is mounted around the shaft G between the washers or plates 33 and 34, which are slidably mounted on the shaft, and collars 35 and 36, or other suitable abutments are provided on the shaft to confine the washers or plates against movement toward the ends of the shaft, while at the same time the movement of the washers toward each other, in which movement the spring 32 would be compressed, is not interfered with. A tubular member 37 is mounted about the spring 32 and the washers 33 and 34 are free to have sliding movement therein, stops 38 and 39 being provided at the ends of the sleeve or tubular member to abut against the washers 33 and 34 as this member is moved in line with the shaft G. Strap metal members 40 and 41 are each connected pivotally with the tubular member 37, and the crank portion 28 of the operating shaft 27 is pivotally mounted through the free ends of these strap metal members which are thus disposed as links connecting from the crank portion to the tubular member 37.

In the use of the device, it will be appreciated that the movement of the clutch pedal C will at all times cause the shaft G to be turned, and that the movement or shifting of the members J and K will be accomplished entirely by the setting of the shaft and the particular cam extensions are rendered active in the operative relation by turning of the shaft, and therefore it is essential that indication be given for proper setting of the operating lever or handle 26. With this purpose in view, we provide adjacent the operating handle 26 a dial 42 which has a rack formation at the edge thereof as indicated at 43, and provided with notched openings to locate and hold the proper settings of the operating lever or handle to shift the shaft G to each of the gear shifting positions. Dial markings will also be provided, and thus the operator at all times has conveniently at hand the operating handle which can be shifted from one setting to another, and which will accurately indicate the exact setting of the part.

The operation of the gear shifting device is as follows:

Assuming that the parts have been assembled in the manner as set forth in this description and disclosed in the drawings, and that connection has been made to the transmission gear shaft and to the clutch pedal as hereinbefore set forth, the operating handle or lever 26 is disposed at such a point that the operator by grasping and swinging the same can turn this lever to neutral, reverse, low, intermediate, or high, and the swinging movement of the operating lever will cause turning movement to be imparted to the rod 25 which through the link and crank arm connection will correspondingly swing the operating shaft 27. As the operating shaft 27 is turned, the crank portion 28 will be swung and through the fact that a direct connection is established from this crank portion to the tubular member or sleeve 37, the sleeve will be moved in line with the length of the shaft G. This movement of the sleeve will cause the stops 38 or 39 to bear against the washers 33 or 34, according to the direction in which the sleeve is moved, and in consequence bearing pressure will be exerted upon the spring 32 to resiliently urge the shaft G to have movement in line with and corresponding to the movement of the sleeve 37. When the cam portion H is in the position shown in Fig. 2, the shaft G will be free to have movement with the sleeve, but when the parts are shifted to the relation shown in Fig. 1, the cam portion will not allow endwise shifting of the shaft at the immediate intervals, and in fact not until the parts are restored to the relation shown in Fig. 2, but under these circumstances shifting of the lever 26 will cause the spring 32 to be compressed and immediately the cam portion is again turned to be released from the engagement with the end of the members J and K, the resilient force upon the shaft will cause the same to move endwise through its bearing mountings in the cross members 2 and 3.

When the desired setting has been given to the operating lever 26, and the clutch pedal C is pressed down to disengage the clutch, the arm I will be swung and consequently the shaft G will be given substantially a quarter turn which will shift the cam portion H to the position shown in Figs. 1 and 5, where the alined extensions thereof will engage with the members J and K. This engagement of the cam extensions with the members J and K will cause the transmission to be set in accordance with the indication given by the position of the lever 26, and as the pedal C is again released and the clutch is permitted to reëngage, the drive through the transmission will be accomplished correspondingly. As the members J and K are not of great width adjacent the openings 14, it is not necessary that the clutch pedal C be entirely released when it is desired to reset the shaft G to bring other cam extensions into active relation, but early partial releasing of this clutch pedal, such as would not be sufficient to permit reëngagement of the clutch, will allow the cam extensions to clear the members J and K at their ends and then the resilient force of the spring 32 will cause the shaft G to be shifted endwise to the desired setting.

Changes in details may be made without departing from the spirit or scope of our invention; but,

We claim:

1. In a gear shifting device, a shift member, a cam comprising a plurality of radially extending arcuate actuating arms of various lengths certain of which are disposed in staggered relation, said cam mounted to have sliding movement to bring different ones of said arms adjacent the shifting member, manually settable means for imparting sliding movement to the cam, means for rocking the cam when brought to a set position to actuate said shifting member, and a gear shifting rod associated with said shifting member.

2. In a gear shifting device the combination with a shaft, of a shifting member, a cam comprising a plurality of radially extending arcuate actuating arms mounted upon said shaft, certain of said arms being of equal length and extending in diametrically opposed relation from opposite sides of the said shaft, the remainder of said actuating arms being of equal length and greater length than said first named arms and disposed in staggered relation with respect to the others, means for shifting said shaft to bring certain of said arms adjacent said shifting member, and means for rocking said cam to operate said shifting member.

3. In a gear shifting device the combination with a shaft, of a shifting member, a cam comprising a plurality of radially extending arcuate actuating arms mounted upon said shaft, certain of said arms being of equal length and extending in diametrically opposed relation from opposite sides of the said shaft, the remainder of said actuating arms being of equal length and greater length than said first named arms and disposed in staggered relation with respect to the others, means for shifting said shaft to bring certain of said arms adjacent said shifting member, and means for rocking said cam to operate said shifting member, and means for returning said cam to its normal or starting position following the operation of said shifting member.

4. In a gear shifting device the combination with a shaft, of a shifting member, a cam having a compound face fixed on said shaft to be moved adjacent the shifting member, means for imparting sliding movement to the shaft to bring different parts of the compound face of the cam adjacent the shifting member, a clutch pedal, a longitudinally extensible rod, connected to said clutch pedal, a plurality of pivotally mounted arms, one of said arms being connected to said longitudinally extensible rod, and another of said arms being connected to said shaft for rocking the shaft and said cam upon pivotal movement of said foot lever to rock the cam for actuating said shifting member.

5. In a gear shifting device the combination with a shaft, of a shifting member, a cam having a compound face fixed on said shaft to be moved adjacent the shifting member, means for imparting sliding movement to the shaft to bring different parts of the compound face of the cam adjacent the shifting member, a clutch pedal, a longitudinally extensible rod, connected to said clutch pedal, a plurality of pivotally mounted arms, one of said arms being connected to said longitudinally extensible rod, and another of said arms being connected to said shaft for rocking the shaft and said cam upon pivotal movement of said foot lever to rock the cam for actuating said shifting member, and means to return the shaft to its normal position upon release of said clutch lever.

EUGENE M. BUSSINGER.
JOHN WEISS.